United States Patent Office 2,697,097
Patented Dec. 14, 1954

2,697,097

PRODUCTION OF HALOGENATED QUINAZOLINE DYESTUFFS

Friedrich Ebel, Mannheim-Feudenheim, Walter Rupp, Ludwigshafen (Rhine-Oppau), and Otto Trauth, Ludwigshafen (Rhine), Germany, assignors to Badische Anilin- & Soda-Fabrik Aktiengesellschaft, Ludwigshafen am Rhine, Germany No Drawing. Application August 17, 1953,
Serial No. 374,811

Claims priority, application Germany September 3, 1952

7 Claims. (Cl. 260—256.4)

This invention relates to an improved process for the production of vat dyestuffs, especially of halogenated quinazolylaminoanthraquinones.

The reaction products of 2.4-dichloroquinazoline with 1-aminoanthraquinones have not acquired any practical importance as vat dyestuffs.

We have now found that valuable yellow to red vat dyestuffs are obtained by reacting water-insoluble yellow to red primary monoamines of the anthraquinone series with quinazolines which are substituted by halogen in the 2- and 4-positions and also in at least one of the positions 5, 6, 7 and 8.

Examples of suitable yellow to red primary monoamines for use as initial materials are 1-aminoanthraquinone, 2-aminoanthraquinone, 1-amino-6-chloroanthraquinone, 1-amino-4-benzoylaminoanthraquinone, and 1-amino-5-benzoylaminoanthraquinone. The anthraquinone nucleus can contain further substituents, provided that they do not cause water-solubility.

Suitable quinazolines are for example 2.4.6.-trichloroquinazoline, 2.4.6.8-tetrachloroquinazoline, 2.4.5.6.7.8-hexachloroquinazoline, 2.4-dichloro-6-bromoquinazoline or 2.4-dibromo-6-chloroquinazoline. The said quinazolines may be reacted either with two identical or with two different amines of the anthraquinone series.

In order to effect the reaction, the components are heated, preferably in calculated proportions, to temperatures between about 100° and 250° C. It is preferable to carry out the reaction at between 130° and 220° C. in a solvent which is substantially inert to halogenoquinazolines, as for example nitrobenzene or dichlorobenzene. It is possible to work in the presence or absence of agents which bind acids. Suitable acid-binding agents are for example sodium acetate, potassium carbonate and pyridine.

The halogen-containing vat dyestuffs thus obtainable are distinguished by high affinity and clear shades.

The following examples will further illustrate this invention but the invention is not restricted to these examples. The parts are parts by weight.

*Example 1*

A mixture of 22.3 parts of 1-aminoanthraquinone, 11.7 parts of 2.4.6-trichloroquinazoline and 500 parts of nitrobenzene is heated at 180° C. for 2 hours while stirring. After cooling, the separated dyestuff is filtered off by suction, washed with nitrobenzene, then with methanol, and dried. 28.5 parts of a dyestuff are obtained which dyes cotton orange shades from a dark brown vat.

By replacing the 1-aminoanthraquinone by 2-aminoanthraquinone, a dyestuff is obtained which dyes cotton powerful yellow shades from a red-brown vat.

*Example 2*

26 parts of 2.4.6.8-tetrachloroquinazoline and 50 parts of 1-amino-6-chloroanthraquinone are stirred with 500 parts of nitrobenzene for 2 hours at 180° C. After the working up described in Example 1, a dyestuff is obtained which dyes cotton powerful orange shades.

The corresponding dyestuff with 1-aminoanthraquinone is yellow-orange.

The necessary 2.4.6.8-tetrachloroquinazoline is obtained as follows:

Equal parts of 3.5-dichloroanthranilic acid and urea are fused together for 45 minutes at 150° to 160° C. and then for 15 minutes at 180° to 200° C. The solidified melt is treated with weakly alkaline water. The portion thereby remaining undissolved is filtered off by suction, washed with water until neutral, dried and sublimed at 200° C. at 1 torr. Pale yellow small needles of the melting point 286° to 287° C. are obtained. 20 parts of the 2.4-dihydroxy-6.8-dichloroquinazoline thus obtained are boiled with 100 parts of phosphorus oxychloride and 37 parts of phosphorus pentachloride for 24 hours. The phosphorus oxychloride is then distilled off and the residue sublimed at 110° to 200° C. at 1 torr. The 2.4.6.8-tetrachloroquinazoline is thus obtained in the form of colourless small needles of the melting point 150° to 152° C.

*Example 3*

From 13.6 parts of 1-amino-5-benzoylaminoanthraquinone, 4.68 parts of 2.4.6-trichloroquinazoline and 250 parts of nitrobenzene or ortho-dichlorobenzene there is obtained, by working in the manner described in the foregoing examples, an orange-red dyestuff the vat of which is dark brown in color.

The analogous dyestuff with 1-amino-4-benzoylaminoanthraquinone dyes currant-red shades from a grey-green vat. In both cases, 2.4.6.8-tetrachloroquinazoline gives quite similar shades of color.

What we claim is:

1. A process for the production of vat dyes which comprises heating a mixture of about equivalent amounts of a primary monoamine of the anthraquinone series selected from the group consisting of 1-aminoanthraquinone, 2-aminoanthraquinone and their chloro-, acetylamino- and benzoylamino derivatives, and of a 2.4-dichloroquinazoline containing a further halogen atom selected from the group consisting of chlorine and bromine in at least one of the positions 5, 6, 7 and 8 in the presence of an inert diluent to temperatures from about 100° to 250° C.

2. Vat dyes of the general formula $$\text{(structural formula)}$$

wherein at least one of the substituents X represents a halogen atom selected from the group consisting of chlorine and bromine and the remainder are hydrogen atoms, and R and R' stand for radicals of the anthraquinone series selected from the group consisting of α- and β-anthraquinonyl and their chloro-, acetylamino- and benzoylamino derivatives.

3. The vat dye of the formula $$\text{(structural formula)}$$

4. The vat dye of the formula
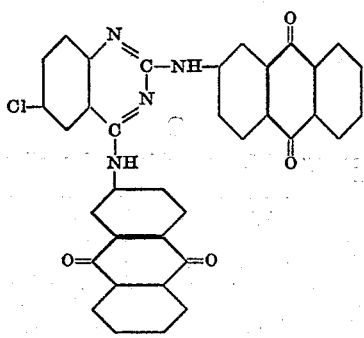
5. The vat dye of the formula
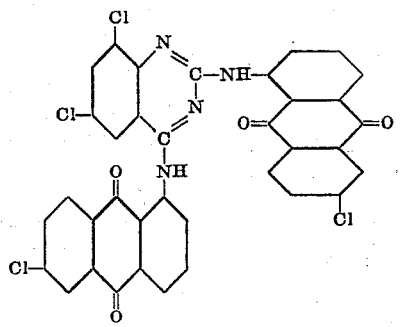
6. The vat dye of the formula
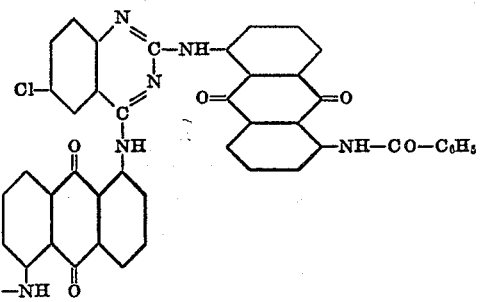
7. The vat dye of the formula
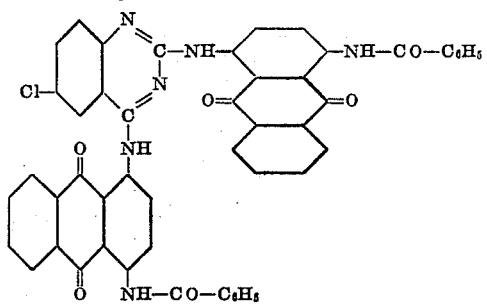
No references cited.